/ United States Patent (12) United States Patent
Otsuki et al.

(10) Patent No.: US 9,068,828 B2
(45) Date of Patent: Jun. 30, 2015

(54) CUTTING DISTANCE CALCULATING DEVICE FOR MULTI-AXIS WORKING MACHINE (71) Applicant: FANUC CORPORATION, Yamanashi (JP)

(72) Inventors: Toshiaki Otsuki, Yamanashi (JP); Hiroyuki Fujimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 132 days.

(21) Appl. No.: 13/744,695

(22) Filed: Jan. 18, 2013

(65) Prior Publication Data
US 2013/0245995 A1 Sep. 19, 2013

(30) Foreign Application Priority Data

Mar. 19, 2012 (JP) ................. 2012-062298

(51) Int. Cl.
G01B 7/00 (2006.01)
G01C 15/00 (2006.01)
B23Q 17/09 (2006.01)
G06F 17/00 (2006.01)
G05B 19/4097 (2006.01)

(52) U.S. Cl.
CPC ............ *G01C 15/00* (2013.01); *B23Q 17/0995* (2013.01); *G06F 17/00* (2013.01); *G05B 19/4097* (2013.01)

(58) Field of Classification Search
CPC ..... G01C 15/00; G06F 17/00; B23Q 17/0995
USPC .......................................... 702/155; 700/186
See application file for complete search history.

(56) References Cited

U.S. PATENT DOCUMENTS

| 4,628,458 A | 12/1986 | Ohta et al. |
| 6,266,572 B1 | 7/2001 | Yamazaki et al. |
| 6,535,788 B1 | 3/2003 | Yoshida et al. |
| 6,584,415 B1 | 6/2003 | Uneme et al. |
| 7,331,739 B2 | 2/2008 | Yoshida et al. |
| 2004/0174130 A1 | 9/2004 | Inoue et al. |

(Continued)

FOREIGN PATENT DOCUMENTS

| CN | 1550287 A | 12/2004 |
| CN | 101271326 A | 9/2008 |

(Continued)

OTHER PUBLICATIONS

Corresponding JP 2012-062298 Decision to Grant a Patent dated May 7, 2013.

(Continued)

*Primary Examiner* — Janet Suglo
*Assistant Examiner* — Stephanie Bloss
(74) *Attorney, Agent, or Firm* — Lowe Hauptman & Ham, LLP (57) ABSTRACT A cutting distance calculating device for a multi-axis working machine acquires axis positions at calculation times for at least three linear axes and two rotation axes of a multi-axis working machine and calculates the position of a tool tip point on the basis of the acquired axis positions. This device accumulates moving distances (cutting distances) of the tool tip points from the calculated position of the tool tip point to thereby calculate a cutting distance and predicts tool wear and tool life on the basis of the calculated cutting distance.

7 Claims, 7 Drawing Sheets

(56) References Cited

U.S. PATENT DOCUMENTS

| | | | |
|---|---|---|---|
| 2005/0090929 A1 | 4/2005 | Dolansky et al. | |
| 2008/0058984 A1* | 3/2008 | Gray et al. | 700/192 |
| 2008/0288103 A1* | 11/2008 | Otsuki et al. | 700/189 |
| 2010/0145499 A1 | 6/2010 | Sato et al. | |
| 2011/0015877 A1 | 1/2011 | Okita et al. | |
| 2011/0046773 A1 | 2/2011 | Iwashita et al. | |
| 2011/0276173 A1 | 11/2011 | Otsuki et al. | |
| 2012/0296462 A1* | 11/2012 | Otsuki et al. | 700/104 |
| 2013/0054182 A1 | 2/2013 | Tezuka et al. | |

FOREIGN PATENT DOCUMENTS

| | | |
|---|---|---|
| CN | 101678523 A | 3/2010 |
| CN | 101859126 A | 10/2010 |
| CN | 101957610 A | 1/2011 |
| DE | 10248991 A1 | 5/2004 |
| JP | 2000-084794 A | 3/2000 |
| JP | 2003-044109 A | 2/2003 |
| JP | 2005-088106 A | 4/2005 |
| JP | 2008-221454 A | 9/2008 |
| JP | 4583415 B2 | 11/2010 |
| JP | 4689745 B2 | 5/2011 |
| JP | 2011-258178 A | 12/2011 |
| JP | 2012-043243 A | 3/2012 |
| JP | 2013-045332 A | 3/2013 |
| WO | 9819822 A1 | 5/1998 |

OTHER PUBLICATIONS

Office Action issued May 29, 2014, corresponds to Chinese patent application No. 201310086018.3.

Office Action dated Nov. 21, 2014, corresponding to German patent application No. 102013102656.7.

Office Action issued Mar. 12, 2015, corresponding to Chinese patent application No. 201310086018.3.

* cited by examiner

CUTTING DISTANCE CALCULATING DEVICE FOR MULTI-AXIS WORKING MACHINE

RELATED APPLICATIONS

The present application is based on, and claims priority from, Japanese Application Number 2012-062298, filed Mar. 19, 2012, the disclosure of which is hereby incorporated by reference herein in its entirety.

BACKGROUND OF THE INVENTION

1. Field of the Invention

The present invention relates to a cutting distance calculating device for a multi-axis working machine.

2. Description of the Related Art

In general, as described in, for example, Japanese Patent Application Laid-Open No. 2008-221454, it is well-known that tool abrasion wear Tw is proportional to a cutting distance (a distance in which a tool moves for cutting) L, i.e., a relation of Expression (1) below holds between the tool abrasion wear Tw and the cutting distance L.

$$Tw = K*L \qquad (1)$$

where, K is a proportionality factor, which changes according to an edge force of a tool edge tip due to a tool type/material, a work material, spindle speed, and feed speed, temperature, and the like.

When tool abrasion wear exceeds a tolerance, a tool exhausts the life thereof. Therefore, to learn the tool abrasion wear and the tool life, a cutting distance of a tool tip point position is important.

Japanese Patent Application Laid-Open No. 2008-221454 discloses a method of predicting tool abrasion wear from a prediction formula using an edge force (an edge force of a tool edge tip) and a cutting distance. The cutting distance is calculated from coordinate information (NC data) of an edge tip (a machining position) of an NC program. Specifically, in predicting tool abrasion wear before machining, a cutting distance is calculated by a simulation. In predicting tool abrasion wear during the machining, a cutting distance is calculated according to data obtained from a numerical controller that controls an NC machine tool.

Japanese Patent Application Laid-Open No. 2011-43874 (corresponding to US 2011/046773 A) discloses a technique for simultaneously acquiring actual position information of respective driving axes at respective times, calculating a three-dimensional coordinate value of a tool tip portion viewed from a coordinate system (a table coordinate system) fixed to a workpiece, and displaying a three-dimensional track of the tool tip portion using the three-dimensional coordinate value.

SUMMARY OF THE INVENTION

However, the technique described in Japanese Patent Application Laid-Open No. 2008-221454 has problems explained below.

In the case of a multi-axis working machine, a cutting distance is not easily obtained from a machining program (an NC program). In the case of a three-axis working machine including three linear axes, a tool tip point path is often instructed together with tool length compensation in a machining program. When a tool tip point path is instructed, if the instruction is a linear instruction, a cutting distance can be obtained from the machining program. However, in the case of the multi-axis working machine, a control point path (positions of three linear axes and positions of two rotation axes on a machine coordinate) is sometimes instructed rather than the tool tip point path in the machining program. When the control point path is instructed, since the control point path and the tool tip point path are different, a cutting distance of a tool tip point is not obtained from the machining program.

Even when the tool tip point path is instructed, not only the linear instruction but also a curve (arc, spline curve, etc.) instruction is sometimes issued in the machining program. When the curve instruction is issued, a cutting distance of an accurate instructed path (tool tip point path) cannot be obtained from an instructed tip point position of the machining program.

The technique disclosed in Japanese Patent Application Laid-Open No. 2011-43874 merely displays the track of the tool tip point. A technique for calculating a cutting distance of the tool tip point is not disclosed.

Therefore, an object of the present invention is to provide a cutting distance calculating device for a multi-axis working machine capable of calculating a relative cutting distance between a work and a tool tip point in a multi-axis working machine, i.e., a moving distance of the tool tip point on the work (on a table) from positions of respective axes at each of short calculation periods rather than from the machining program.

A cutting distance calculating device for a multi-axis working machine according to the present invention is a cutting distance calculating device for a multi-axis working machine that calculates a moving distance of a tool tip point in a multi-axis working machine including at least three linear axes and two rotation axes, the cutting distance calculating device for a multi-axis working machine including: a positional-information acquiring section configured to acquire axis positions at calculation times of the at least three linear axes and two rotation axes; a tool-tip-point-position calculating section configured to calculate a tool tip point position on the basis of the axis positions acquired by the position-information acquiring section; and a cutting-distance calculating section configured to accumulate moving distances of the tool tip point on the basis of the tool tip point position calculated by the tool-tip-point-position calculating section and set an accumulated moving distance as a cutting distance.

The positional-information acquiring section can acquire the axis positions from a numerical controller that controls the multi-axis working machine or acquire the axis positions from a numerical controller simulator that simulates the operation of the numerical controller that controls the multi-axis working machine.

In acquiring the axis positions, the positional-information acquiring section can also acquire cutting mode information indicating that the axis positions to be acquired are positions by a cutting mode. The cutting-distance calculating section can accumulate only moving distances of the tool tip point during the cutting mode and set an accumulated moving distance as a cutting distance.

The multi-axis working machine can be a tool head rotation type multi-axis working machine, a table rotation type multi-axis working machine, or a mixed type multi-axis working machine.

According to the present invention, it is possible to provide a cutting distance calculating device for a multi-axis working machine capable of calculating a moving distance of a tool tip point on a work (on a table), which is a relative cutting distance between the work and the tool tip point in a multi-axis working machine, i.e., a cutting distance of the tool tip point. The cutting distance can be calculated from a numerical controller that performs numerical control of machining or can be calculated from a numerical controller simulator. Only a cutting distance during a cutting mode can be calculated. The calculated cutting distance is used for prediction of tool wear and tool life.

BRIEF DESCRIPTION OF THE DRAWINGS

The abovementioned object, other objects, and characteristics of the present invention will be made apparent from embodiments explained below with reference to the accompanying drawings. Among the drawings.

DESCRIPTION OF THE PREFERRED
EMBODIMENTS

Embodiments of the present invention are explained below with reference to the drawings. Components having the same functions and components having similar functions are denoted by the same reference numerals and signs.

First Embodiment

Figure 1:
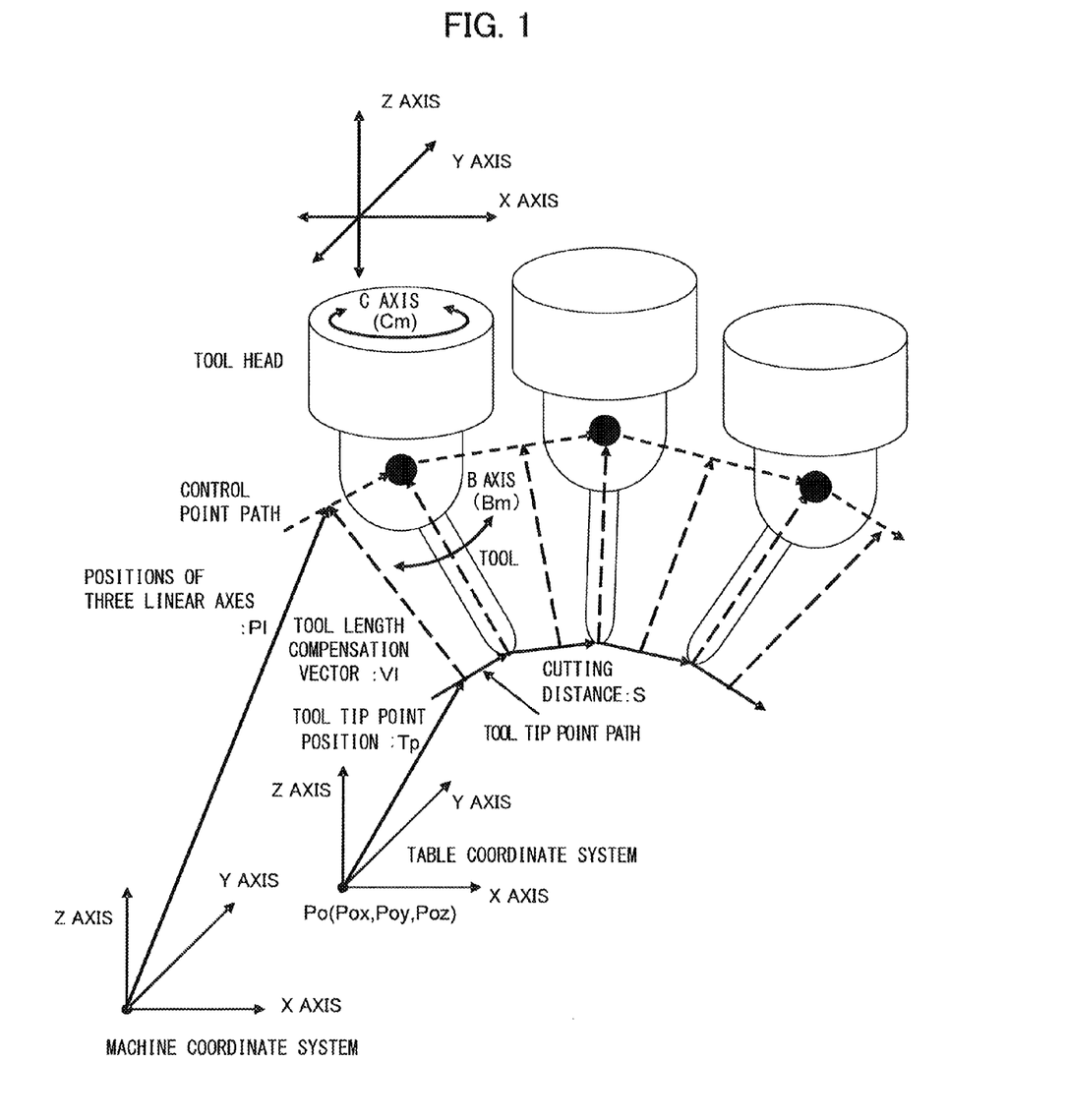
FIG. 1 is a diagram for explaining a tool head rotation type multi-axis working machine and is a diagram for explaining that, when a control point path is instructed in a machining program in the multi-axis working machine, the control point path and a tool tip point path are different and a cutting distance of a tool tip point is not obtained from the machining program.
Figure 2:
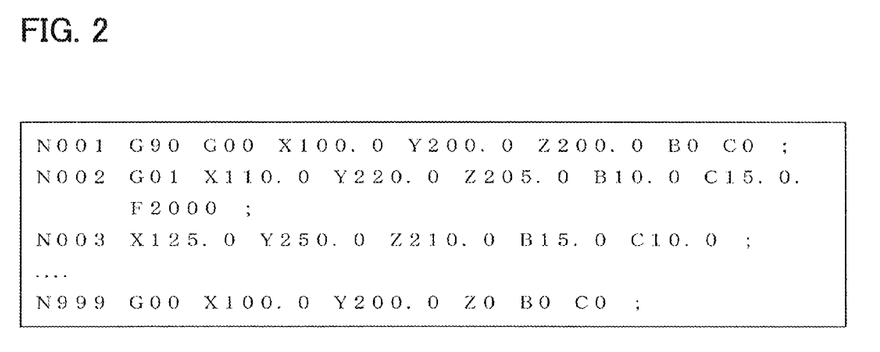
FIG. 2 is an example of the machining program executed in the multi-axis working machine.

A cutting distance calculating device according to a first embodiment of the present invention is applied to a tool head rotation type multi-axis working machine shown in FIG. 1. A tool head of the tool head rotation type multi-axis working machine linearly moves along three linear axes, i.e., an X axis, a Y axis, and a Z axis and rotationally moves about two rotation axes, i.e., a C axis and a B axis. An example of a machining program of the tool head rotation type multi-axis working machine is shown in FIG. 2.

"N001" represents movement by rapid feed to a machining start position for machining in and after "N002". Linear interpolation machining is performed in and after "N002". "F" represents instructed speed. "N999" represents movement of rapid feed for ending. X, Y, and Z instruct end positions of movement indicated by arrows of a control point path shown in FIG. 1. B and C instruct rotation axis positions. A tool length compensation amount is separately set by a parameter or the like.

The cutting distance calculating device for a multi-axis working machine according to the first embodiment of the present invention is explained with reference to FIG. 9.

A numerical controller 20 includes an instruction analyzing section 22 and an interpolation section 24. These sections read and analyze a machining program 10 respectively in the instruction analyzing section 22 to create interpolation data and performs interpolation in the interpolation section 24 according to the created interpolation data to drive servos (26X, 26Y, 26Z, 26B, and 26C) of respective axes. Therefore, in an example of the cutting distance calculating device for a multi-axis working machine shown in FIG. 9, concerning the three linear axes, positions Pl of the three linear axes on the control point path shown in FIG. 1 are interpolated according to X, Y, and Z instructions of the machining program 10. Concerning the two rotation axes, positions of the rotation axes are interpolated according to B and C instructions of the machining program 10, whereby the axis servos are driven.

A cutting distance calculating device 30 includes a positional-information acquiring section 32, a tool-tip-point-position calculating section 34, and a cutting-distance calculating section 36. The positional-information acquiring section 32 acquires, from the numerical controller 20, interpolated positions Pm of respective axes at "calculation times" as positions $Pl(Xm, Ym, Zm)^T$ of the three linear axes and positions $Pr(Bm, Cm)$ of the two rotation axes on a machine coordinate system. The tool-tip-point-position calculating section 34 calculates tool tip point positions $Tp(Xt, Yt, Zt)^T$ on a table coordinate system on the basis of the acquired positions of respective axes as indicated by Expression (2-1) and Expression (2-2) below.

Figure 3:
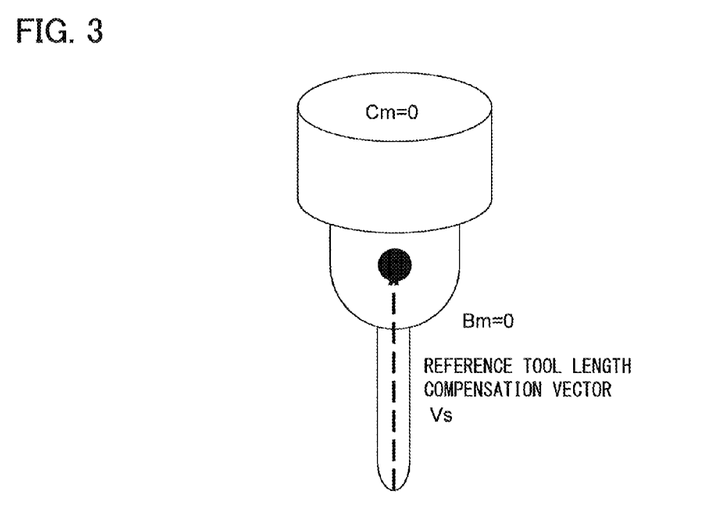
FIG. 3 is a diagram for explaining a reference tool length compensation vector Vs at the time when a relation among positions of two rotation axes (a B axis and a C axis) is Cm=Bm=0.

Processing by the cutting distance calculating device 30 is repeated at each calculation period $\Delta t$. The calculation period $\Delta t$ is usually short time equal to or shorter than several milliseconds. The "calculation time" is time at a certain period. The calculation period $\Delta t$ may be the same as or may be different from an interpolation period for performing interpolation of the numerical controller 20. $Po(Pox, Poy, Poz)^T$ are positions on a machine coordinate of the origin of a coordinate system (a table coordinate system) fixed on a table on which a work is placed. The interpolated positions Pl of the three linear axes are position vectors on the control point path in the machine coordinate system fixed to the machine in FIG. 1. The tool tip point positions Tp are position vectors on the tool tip point path in the table coordinate system. Vl represents tool length compensation vectors on the table coordinate system from the tool tip point positions Tp to the positions Pl of the three linear axes and vectors obtained by respectively rotating the reference tool length compensation vector Vs (see FIG. 3) at the time of Bm=Cm=0 by Bm and Cm. Rt represents a rotation matrix from the machine coordinate system to the table coordinate system. Since there is no rotation element from the machine coordinate system to the table coordinate system in the case of the tool head rotation type, the rotation matrix is a unit matrix. Rc and Rb represent rotation matrices based on the interpolated positions Pr(Bm, Cm) of the two rotation axes. "T" represents transposition but is not specifically shown in the figures and not specifically described when obvious.

$$Tp = Rt*(Pl - Po) - Vl \quad (2\text{-}1)$$

$$Rt = \begin{bmatrix} 1 & 0 & 0 \\ 0 & 1 & 0 \\ 0 & 0 & 1 \end{bmatrix} Rc = \begin{bmatrix} \cos(Cm) & -\sin(Cm) & 0 \\ \sin(Cm) & \cos(Cm) & 0 \\ 0 & 0 & 1 \end{bmatrix} \quad (2\text{-}2)$$

$$Rb = \begin{bmatrix} \cos(Bm) & 0 & \sin(Bm) \\ 0 & 1 & 0 \\ -\sin(Bm) & 0 & \cos(Bm) \end{bmatrix} Vl = Rc*Rb*Vs$$

The tool tip point position Tp at calculation time $t_i$ is represented as $Tp(t_i)$. As indicated by Expression (3) below, a distance from a tool tip point position $Tp(t_{i-1})$ at calculation time $t_{i-1}$ to the tool tip point position Tp $(t_i)$ at the calculation time $t_{1i}$ is a moving distance $S(t_i)$ of the tool tip point from the calculation time $t_{i-1}$ to the calculation time $t_i$.

$$S(t_i) = |Tp(t_i) - Tp(t_{i-1})| \quad (3)$$

A cutting distance S is obtained by accumulating $S(t_i)$ at each of calculation times in the cutting-distance calculating section 36 as indicated by Expression (4) below.

$$S = \sum_i S(t_i) \quad (4)$$

The positional-information acquiring section 32 can acquire positions of respective axes from the numerical controller 20, acquire cutting mode information indicating that the positions are positions by a cutting mode such as linear interpolation or circular interpolation excluding rapid feed, and accumulate the moving distances only during the cutting mode in the accumulation of Expression (4). Consequently, it is possible to calculate a cutting distance excluding movement during a non-cutting mode such as rapid feed. The same applies in the cases of second and third embodiments explained below. Cutting mode information only has to be one-bit information. Therefore, usually, the cutting mode information is one-bit cutting mode flag (FC).

In the above explanation, the two rotation axes for rotating the tool head of the tool head rotation type multi-axis working machine are the C axis and the B axis. However, a cutting distance can be calculated in the same manner when the aforementioned two rotation axes are an A axis and a B axis or the A axis and the C axis. In the above explanation, the rotation axes for rotating the tool head of the tool head rotation type multi-axis working machine are the two rotation axes. However, a cutting distance can be calculated in the same manner when the rotation axes for rotating the tool head are three rotation axes. The same applies in the second and third embodiments.

Figure 12:
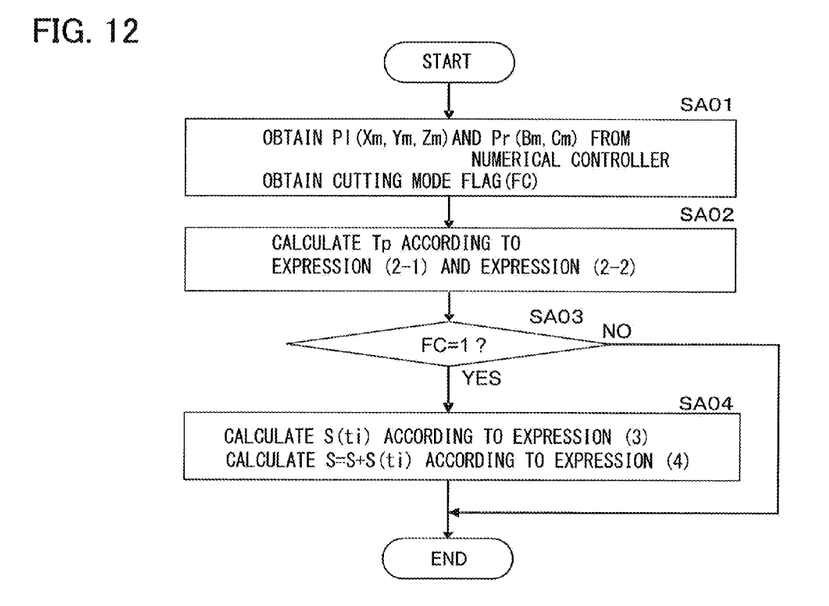
FIG. 12 is a flowchart for explaining processing at calculation time ti executed by the cutting distance calculating device for a multi-axis working machine according to the first embodiment of the present invention.

Processing at the calculation time ti executed by the cutting distance calculating device according to the first embodiment of the present invention is explained with reference to a flowchart of FIG. 12. The processing is explained below according to respective steps.

[Step SA01] The cutting distance calculating device acquires the positions Pl(Xm, Ym, Zm) of the three linear axes and the positions Pr(Bm, Cm) of the two rotation axes on the machine coordinate system and the cutting mode flag (FC) from the numerical controller.

[Step SA02] The cutting distance calculating device calculates the tool tip point position Tp according to Expression (2-1) and Expression (2-2).

[Step SA03] The cutting distance calculating device determines whether the cutting mode flag (FC) is 1 or not. When the cutting mode flag (FC) is 1 (YES), the cutting distance calculating device shifts to step SA04. When the cutting mode flag (FC) is not 1 (NO), the cutting distance calculating device ends the processing.

[Step SA04] The cutting distance calculating device calculates the moving distance S(ti) from the calculation time to the calculation time $t_i$ of the tool tip point according to Expression (3) and performs calculation of $S=S+S(t_i)$ (i.e., the calculation of Expression (4)). An initial value of S representing a cutting distance is set to 0.

Figure 9:
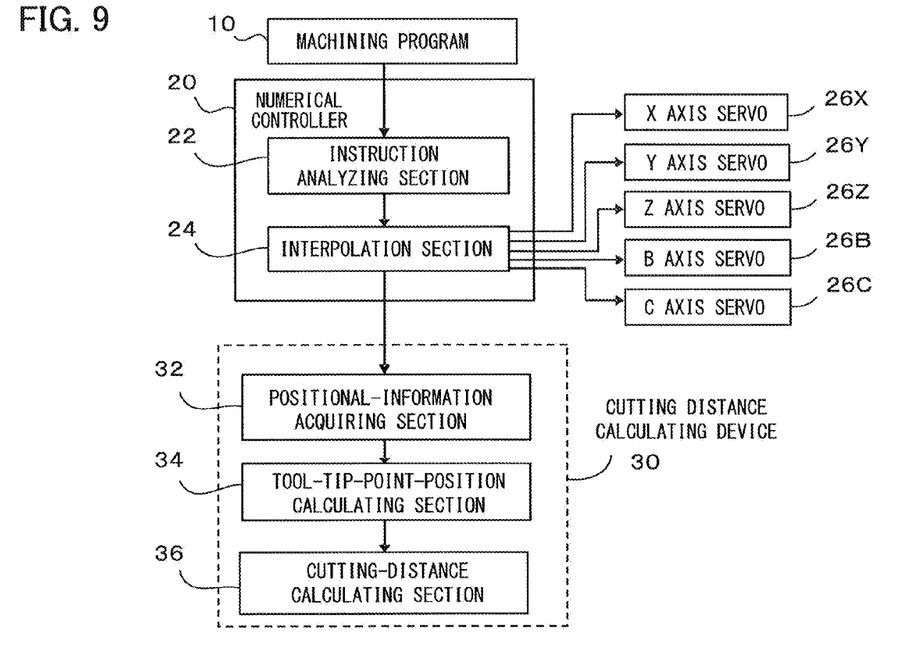
FIG. 9 is a diagram for explaining a cutting distance calculating device for a multi-axis working machine according to a first embodiment of the present invention.

In the cutting distance calculating device 30 shown in FIG. 9, the positional-information acquiring section 32 executes the processing in step SA01, the tool-tip-point-position calculating section 34 executes the processing in step SA02, and the cutting-distance calculating section 36 executes the processing in steps SA03 and SA04.

Figure 13:
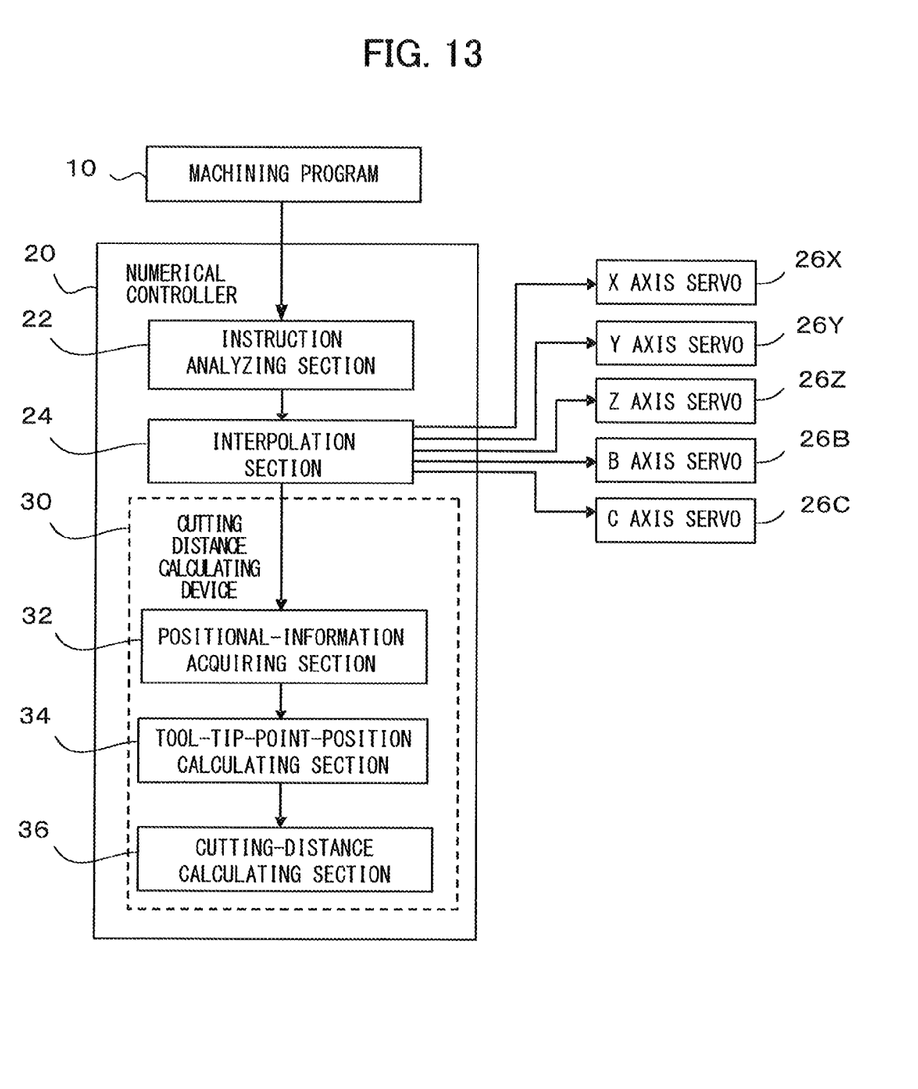
FIG. 13 is a diagram for explaining an embodiment in which a cutting distance calculating device is incorporated as a part of a numerical controller.

In the block diagram of FIG. 9, the cutting-distance calculating device 30 is shown as being present on the outside of the numerical controller 20. However, as shown in FIG. 13, the cutting-distance calculating device 30 may be present in the numerical controller 20, i.e., may be a part of the numerical controller 20.

Second Embodiment

Figure 4:
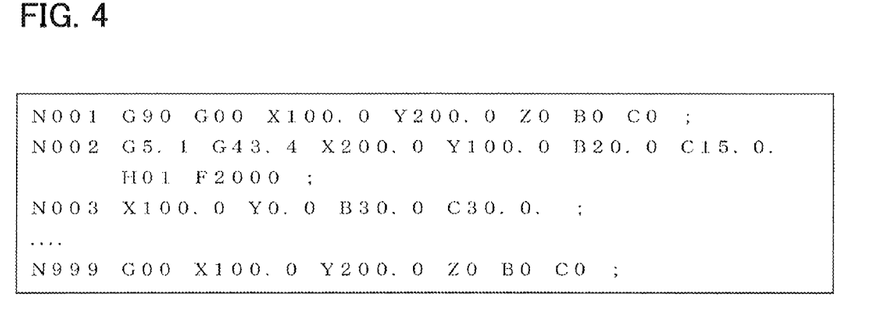
FIG. 4 is an example of a machining program for a spline curve executed in the multi-axis working machine.
Figure 6:
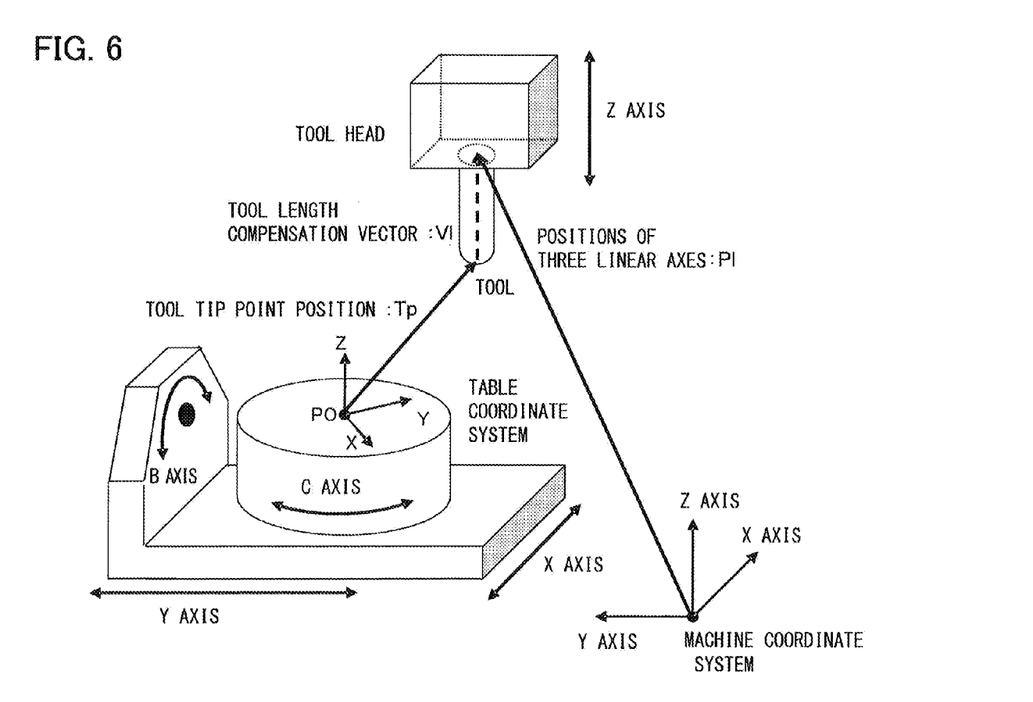
FIG. 6 is a diagram for explaining a table rotation type multi-axis working machine that rotates about the B axis and the C axis.

A cutting distance calculating device according to a second embodiment of the present invention is applied to a table rotation type multi-axis working machine shown in FIG. 6. A tool head of the table rotation type multi-axis working machine linearly moves along a Z axis and a table rotationally moves about two rotation axes, i.e., a C axis and a B axis and linearly moves along two linear axes, i.e., an X axis and a Y axis. An example of a machining program of the table rotation type multi-axis working machine is shown in FIG. 4.

Figure 5:
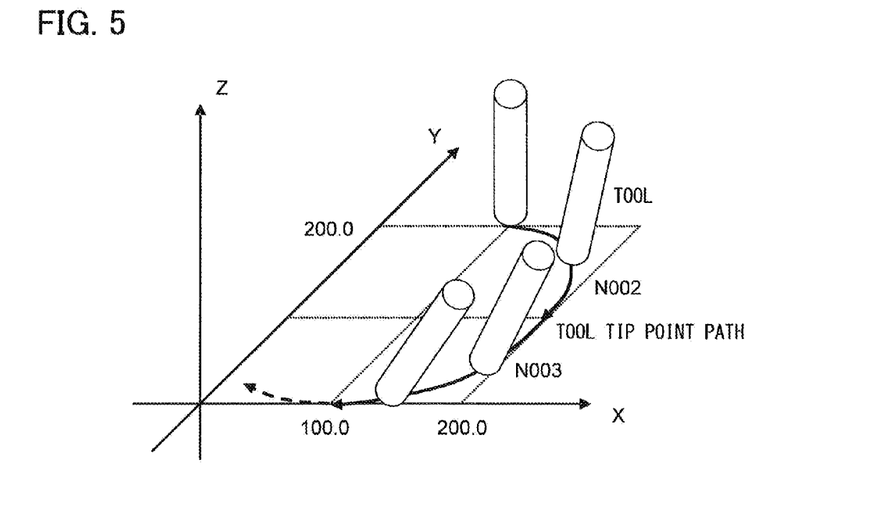
FIG. 5 is a diagram for explaining a tool tip point path (an instructed path) by an instruction of X, Y, and Z on a table coordinate system and a tool direction.

"N001" represents movement by rapid feed to a machining start position for machining in and after "N002". Machining by a spline curve instruction is performed in and after "N002". "G5.1" represents an instruction of a spline curve. "F" is instructed speed. "N999" represents movement of rapid feed for ending. X, Y, and Z instruct tool tip point positions on a table coordinate system that rotates about the B and C axes in FIG. 6. "G43.4" (generally referred to as tool tip point control) indicates that the instructions of X, Y, and Z are instruction of the table coordinate system and "H" represents a tool length compensation number. B and C instruct rotation axis positions. A tool tip point path (an instructed path) by the instructions of X, Y, and Z and a tool direction are as shown in FIG. 5 on the table coordinate system. Since tools relatively rotate on the table coordinate system, the tools are drawn to rotate in FIG. 5.

Figure 10:
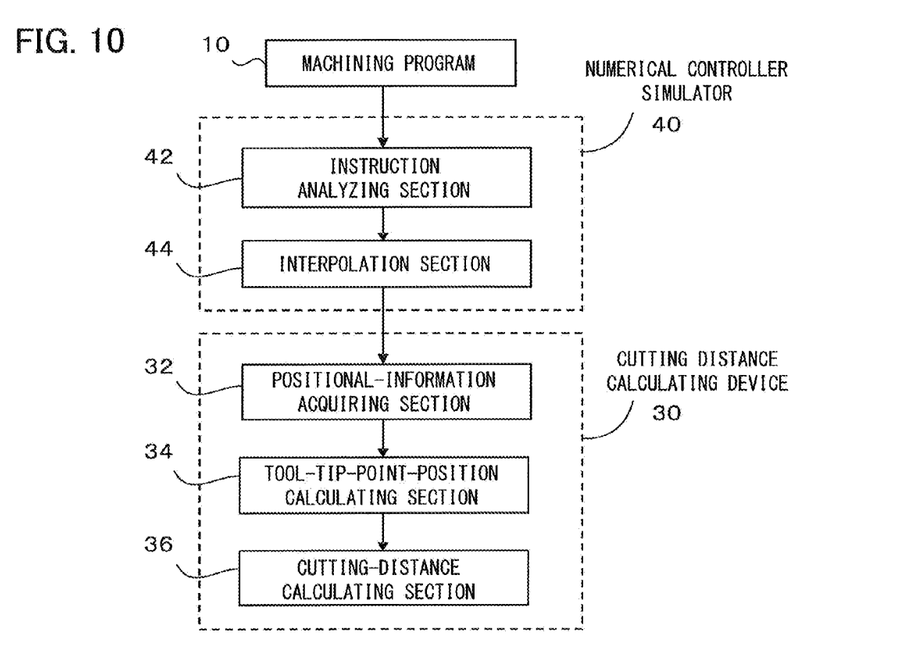
FIG. 10 is a diagram for explaining a cutting distance calculating device for a multi-axis working machine according to a second embodiment of the present invention.

The cutting distance calculating device for a multi-axis working machine according to the second embodiment of the present invention is explained with reference to FIG. 10.

A numerical controller simulator 40 includes an instruction analyzing section 42 and an interpolation section 44 and simulates the operation of the numerical controller 20. Specifically, the instruction analyzing section 42 performs a simulation for reading and analyzing the machining program 10 to create interpolation data. The interpolation section 44 performs a simulation for performing interpolation according to the interpolation data. The numerical controller simulator 40 belongs to the related art.

The cutting distance calculating device 30 includes the positional-information acquiring section 32, the tool-tip-point-position calculating section 34, and the cutting-distance calculating section 36. The positional-information acquiring section 32 acquires positions Pm of respective axes at interpolation times simulated by the numerical controller simulator 40 as positions Pl(Xm, Ym, Zm) of the three linear axes and positions Pr(Bm, Cm) of the two rotation axes on a machine coordinate system. The tool-tip-point-position calculating section 34 calculates tool tip point positions Tp(Xt, Yt, Zt) on the table coordinate system on the basis of the acquired axis positions as indicated by Expression (5-1) and Expression (5-2) below.

It is assumed that calculation times in the cutting distance calculating device 30 are the same as the interpolation times in the numerical controller simulator 40. Expression (5-1) of Expressions (5-1) and (5-2) for calculating the tool tip point positions Tp on the table coordinate system is the same as Expression (2-1). However, Expression (5-2), which is an expression of the rotation matrix Rt from the machine coordinate system to the table coordinate system, is different from Expression (2-2). As in the first embodiment, Vl represents tool length compensation vectors on the table coordinate system from the tool tip point positions Tp to the positions Pl of the three linear axes, that is, vectors which are obtained by respectively rotating the reference tool length compensation vector Vs (not shown in the figure) at the time of Bm=Cm=0 by Bm and Cm. Po represents a crossing point of a B axis rotation center line and a C axis rotate center line (not shown in the figure). Since what are represented by other reference signs in this embodiment are the same as those represented by the same signs in the first embodiment, explanation of the signs is omitted.

$$Tp = Rt * (Pl - Po) - Vl \quad (5\text{-}1)$$

$$Rt = Rc * Rb \quad Rc = \begin{bmatrix} \cos(Cm) & -\sin(Cm) & 0 \\ \sin(Cm) & \cos(Cm) & 0 \\ 0 & 0 & 1 \end{bmatrix} \quad (5\text{-}2)$$

$$Rb = \begin{bmatrix} \cos(Bm) & 0 & \sin(Bm) \\ 0 & 1 & 0 \\ -\sin(Bm) & 0 & \cos(Bm) \end{bmatrix} \quad Vl = Rc * Rb * Vs$$

Third Embodiment

Figure 7:
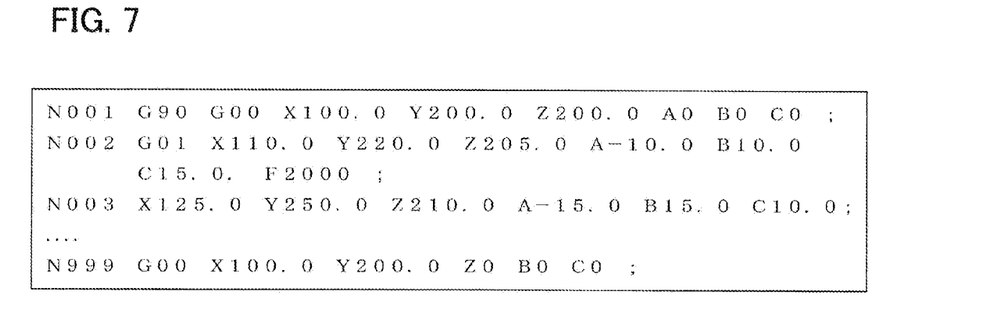
FIG. 7 is an example of a machining program executed in the multi-axis working machine.
Figure 8:
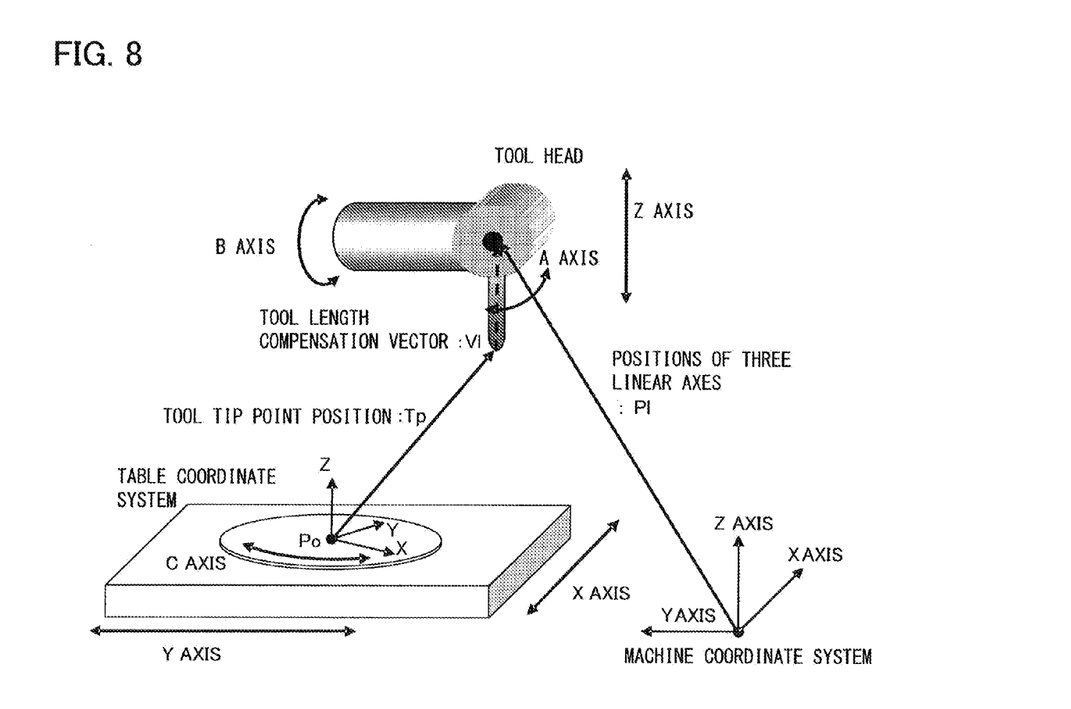
FIG. 8 is a diagram for explaining a mixed type multi-axis working machine (in which both of a tool head and a table rotate)

A cutting distance calculating device according to a third embodiment of the present invention is applied to a mixed type multi-axis working machine in which both of a tool head and a table rotate as shown in FIG. 8. There are three rotation axes of the mixed type multi-axis working machine. The tool head rotates about two rotation axes, i.e., an A axis and a B axis and linearly moves along a linear axis, i.e., a Z axis. The table rotates about a C axis and linearly moves along two linear axes, i.e., an X axis and a Y axis. An example of a machining program of the mixed type multi-axis working machine is shown in FIG. 7. The machining program is substantially the same as the machining program in the first embodiment shown in FIG. 2. However, the A axis is instructed instead of the C axis. X, Y, and Z instruct a control point path. A, B, and C instruct rotation axis positions. A tool length compensation amount is separately set by a parameter or the like.

Figure 11:
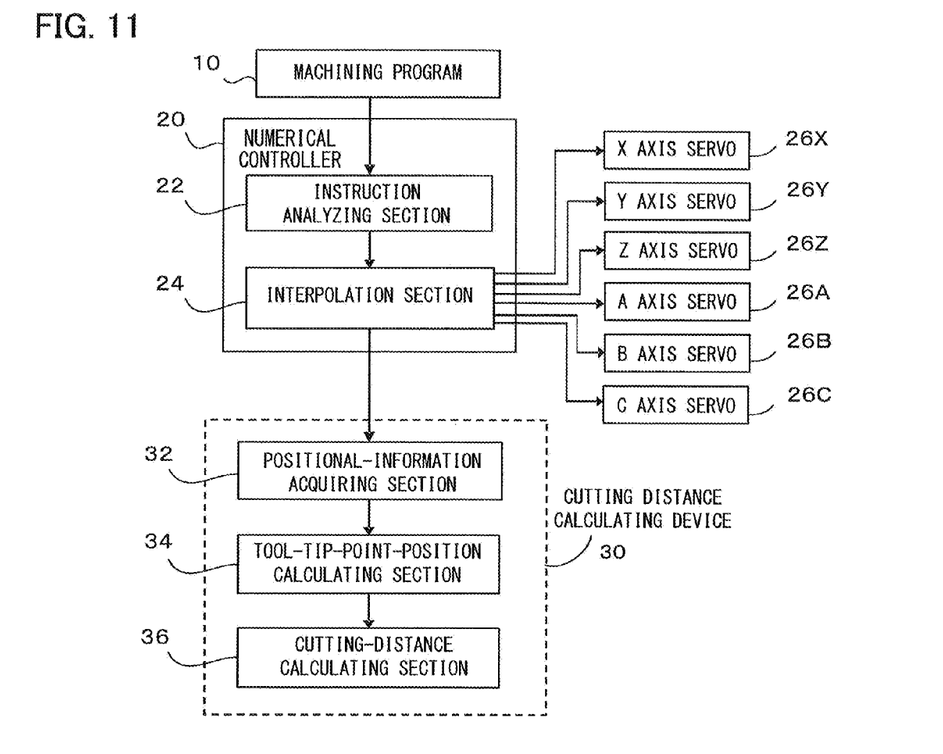
FIG. 11 is a diagram for explaining a cutting distance calculating device for a multi-axis working machine according to a third embodiment of the present invention.

The cutting distance calculating device for a multi-axis working machine according to the third embodiment of the present invention is explained with reference to FIG. 11.

The numerical controller 20 includes the instruction analyzing section 22 and the interpolation section 24. The instruction analyzing section 22 reads and analyzes the machining program 10 to create interpolation data and the interpolation section 24 performs interpolation according to the interpolation data to drive the servos of respective axes (26X, 26Y, 26Z, 26A, 26B, and 26C).

The cutting distance calculating device 30 includes the positional-information acquiring section 32, the tool-tip-point-position calculating section 34, and the cutting-distance calculating section 36. The positional-information acquiring section 32 acquires, from the numerical controller 20, positions Pm of respective axes interpolated at calculation times, as positions Pl(Xm, Ym, Zm) of the three linear axes and positions Pr(Am, Bm, Cm) of the three rotation axes on a machine coordinate system. The tool-tip-point-position calculating section 34 calculates tool tip point positions Tp(Xt, Yt, Zt) on a table coordinate system on the basis of the acquired axis positions as indicated by Expression (6-1) and Expression (6-2) below.

The calculation times are the same as the calculation times in the first embodiment. Expression (6-1) is the same as Expression (2-1). However, Expression (6-2), which is an expression of the rotation matrix Rt from the machine coordinate system to the table coordinate system, is different from Expression (2-2). In FIG. 8, Vl represents tool length compensation vectors on the table coordinate system from the tool tip point positions Tp to the positions Pl of the three linear axes, that is, vectors which are obtained by respectively rotating the reference tool length compensation vector Vs (not shown in the figure) at the time of Am=Bm=Cm=0 by Am, Bm, and Cm. Ra, Rc, and Rb represent rotation matrices based on the interpolated positions Pr(Am, Bm, Cm) of the three rotation axes. Since what are represented by other reference signs in this embodiment are the same as those represented by the same signs in the first embodiment, explanation of the signs is omitted.

$$Tp = Rt * (Pl - Po) - Vl \quad (6\text{-}1)$$

$$Rt = Rc \quad (6\text{-}2)$$

$$Rc = \begin{bmatrix} \cos(Cm) & -\sin(Cm) & 0 \\ \sin(Cm) & \cos(Cm) & 0 \\ 0 & 0 & 1 \end{bmatrix}$$

$$Rb = \begin{bmatrix} \cos(Bm) & 0 & \sin(Bm) \\ 0 & 1 & 0 \\ -\sin(Bm) & 0 & \cos(Bm) \end{bmatrix}$$

$$Ra = \begin{bmatrix} 1 & 0 & 0 \\ 0 & \cos(Am) & -\sin(Am) \\ 0 & \sin(Am) & \cos(Am) \end{bmatrix} \quad Vl = Rc * Rb * Ra * Vs$$

What is claimed is:
1. A multi-axis working machine, comprising:
   at least three linear axes and two rotation axes;
   a tool driven by the at least three linear axes and two rotation axes, the tool having a tool tip point; and a cutting distance calculating device comprising:
- a positional-information acquiring section configured to acquire axis positions at calculation times for the at least three linear axes and two rotation axes;
- a tool-tip-point-position calculating section configured to calculate a tool tip point position of the tool tip point on the basis of the axis positions acquired by the position-information acquiring section; and
- a cutting-distance calculating section configured to accumulate moving distances of the tool tip point on the basis of the tool tip point position calculated by the tool-tip-point-position calculating section and set an accumulated moving distance as a cutting distance, wherein the cutting distance calculating device is configured to predict tool wear based on the cutting distance.

2. The multi-axis working machine according to claim 1, wherein the positional-information acquiring section is configured to acquire the axis positions from a numerical controller that is configured to control the multi-axis working machine.

3. The multi-axis working machine according to claim 1, wherein the positional-information acquiring section is configured to acquire the axis positions from a numerical controller simulator that is configured to simulate operation of a numerical controller that is configured to control the multi-axis working machine.

4. The multi-axis working machine according to claim 1, wherein
the positional-information acquiring section is also configured to acquire, in acquiring the axis positions, cutting mode information indicating that the axis positions to be acquired are positions based on a cutting mode, and
the cutting-distance calculating section is configured to accumulate only moving distances of the tool tip point during the cutting mode and set accumulated moving distances as a cutting distance.

5. The multi-axis working machine according to claim 1, wherein the multi-axis working machine is a tool head rotation type multi-axis working machine.

6. The multi-axis working machine according to claim 1, wherein the multi-axis working machine is a table rotation type multi-axis working machine.

7. The multi-axis working machine according to claim 1, wherein the multi-axis working machine is a mixed type multi-axis working machine.

* * * * *